Sept. 18, 1934.  W. F. GOEHRING  1,974,023
HYDRAULIC CLUTCH
Filed Oct. 4, 1932  3 Sheets-Sheet 1
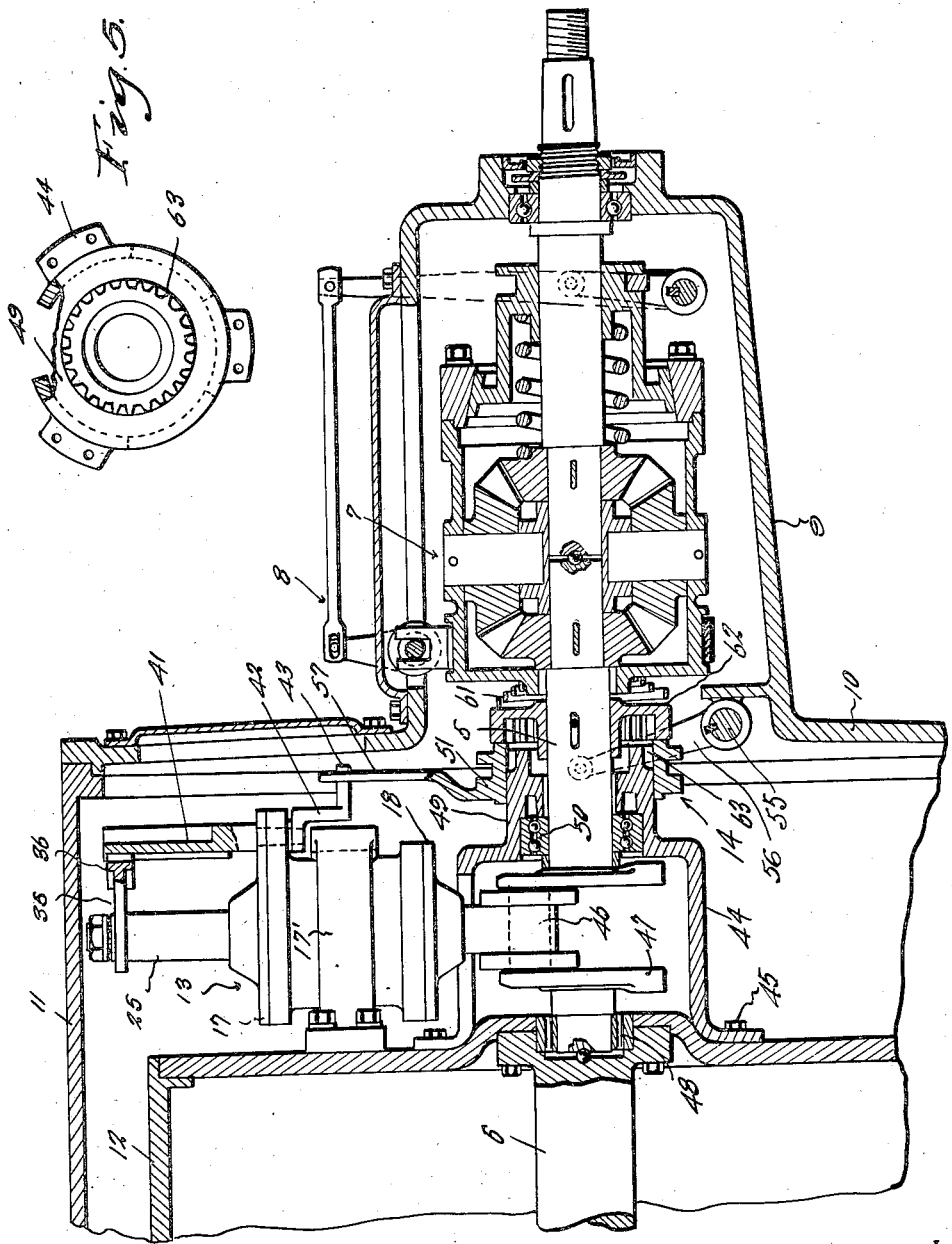
Inventor
W. F. Goehring
By Clarence A. O'Brien
Attorney Sept. 18, 1934.   W. F. GOEHRING   1,974,023
HYDRAULIC CLUTCH
Filed Oct. 4, 1932   3 Sheets-Sheet 2
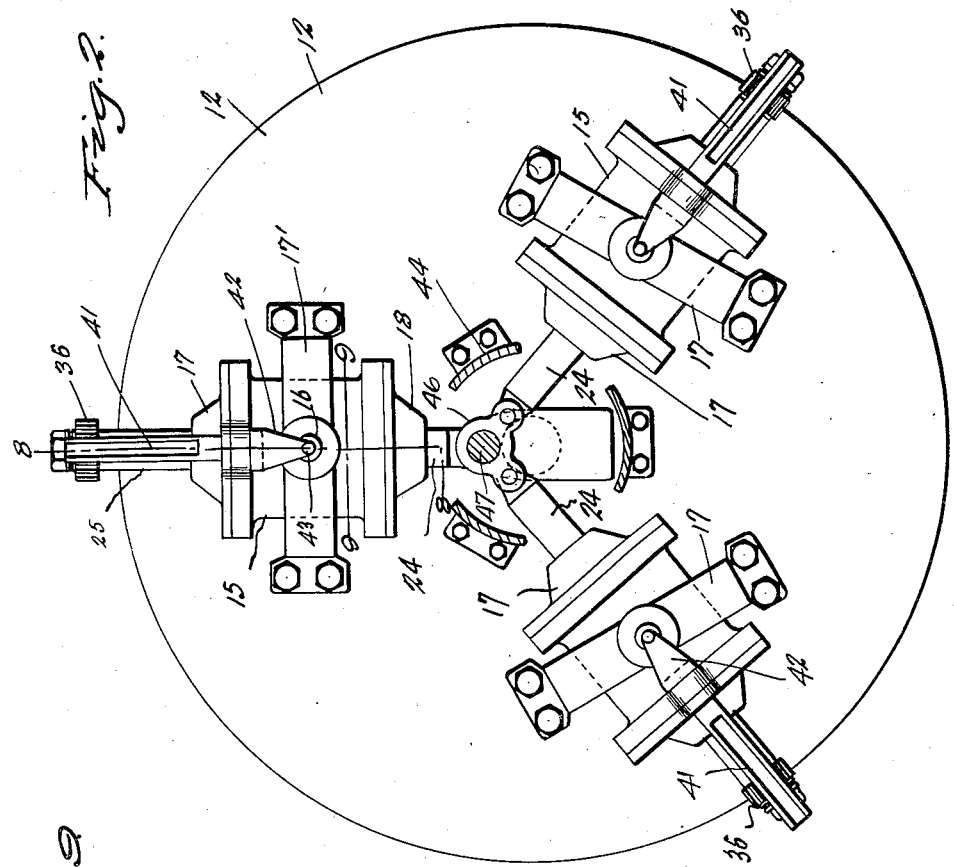
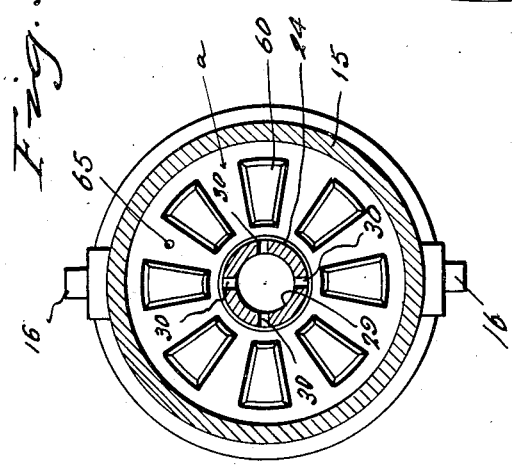
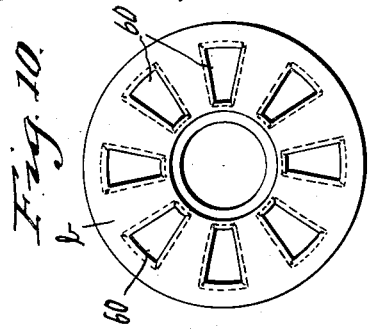
Inventor
W. F. Goehring
By *Clarence A. O'Brien*
Attorney Sept. 18, 1934.  W. F. GOEHRING  1,974,023
HYDRAULIC CLUTCH
Filed Oct. 4, 1932  3 Sheets-Sheet 3
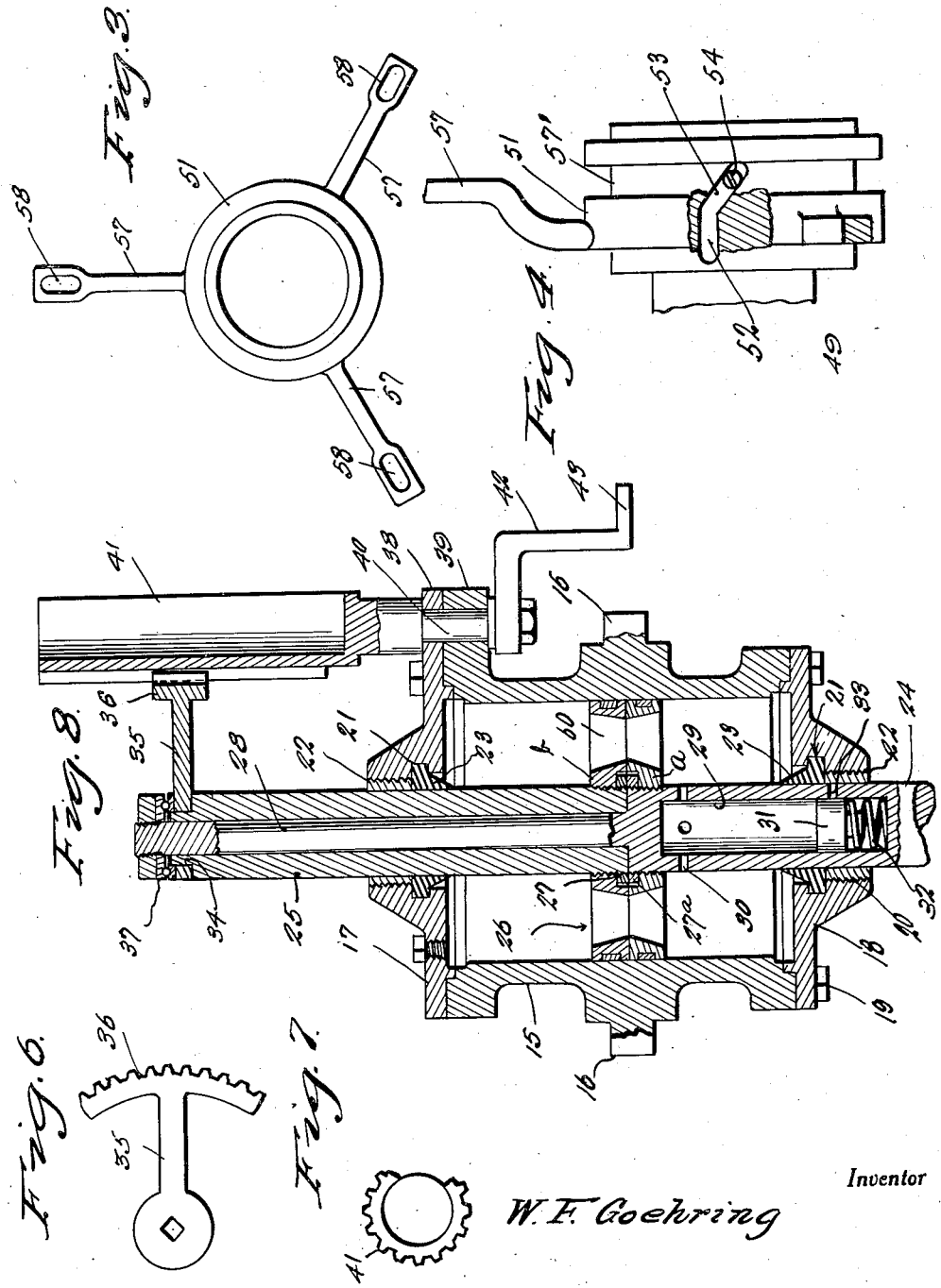
Inventor
W. F. Goehring
By Clarence A. O'Brien
Attorney Patented Sept. 18, 1934

1,974,023

UNITED STATES PATENT OFFICE 1,974,023

HYDRAULIC CLUTCH

William F. Goehring, Baltimore, Md.

Application October 4, 1932, Serial No. 636,242

3 Claims. (Cl. 192—57)

This invention appertains to new and useful improvements in hydraulic clutches and is an improvement on my copending application Serial No. 508,763 which was filed January 14, 1931 and issued on April 18, 1933, the patent number being 1,903,993.

The principal object of this invention is to provide an automatic clutch of the hydraulic type which after its automatic operation to high speed can be locked so that the drive will be and is maintained directly from the drive to the driven shaft.

Another important object of the invention is to provide a hydraulic clutch employing cylinders forming oil chambers in which pistons operate, with safety means whereby an excessive pressure within the cylinder can be automatically released.

These and various other important objects and advantages of the invention will become apparent to the reader of the following specification.

In the drawings:

Figure 1 represents a fragmentary longitudinal sectional view through the novel clutch and operating means showing the parts related for an intermediate speed.

Figure 2 is a vertical sectional view looking at the front side of the fly wheel.

Figure 3 is a front elevational view of the clutch operating collar.

Figure 4 represents a fragmentary side elevational view of the clutch operating collar and associated details.

Figure 5 is a front end elevational view of the spider carried gear.

Figure 6 is a top plan view of the quadrant gear.

Figure 7 represents an end elevational view of one of the semi-cylindrical gears.

Figure 8 represents a longitudinal sectional view through one of the clutch cylinders.

Figure 9 represents a sectional view taken substantially on the line 9—9 of Figure 2.

Figure 10 represents and in side elevational view of one of the plates of the piston shown in Figure 8.

Referring to the drawings wherein like numerals designate like parts, it can be seen in Figure 1 that numeral 5 represents the drive shaft and numeral 6 the driven shaft. In advance or forwardly of the drive shaft is the reverse gear mechanism generally referred to by the numeral 7 and its operating means generally referred to by numeral 8 which forms no particular part of the present invention and which is of the well known planetary type of transmission. A case 9 is provided for the mechanism 7 and this merges into a cover plate 10 for the front end of the fly wheel housing 11. Numeral 12 represents the flywheel, while 13 generally refers to the hydraulic clutch mechanism which is principally covered in my Patent No. 1,903,993. The locking mechanism for the clutch 13 is generally referred to by numeral 14.

While the clutch mechanism 13 is generally similar to the corresponding structure in my Patent No. 1,903,993 it will be observed that there are several modifications. The cylinders 15 are radially arranged as shown in Figure 2 each being provided with outwardly projecting diametrically opposite trunnions 16, 16 engaging into the sides of an arbor 17' carried by the flywheel 12. Each cylinder 15 is provided with an outer head 17 and an inner head 18 and the heads are secured to the ends of the cylinder by suitable screws 19. Each of the heads 17 and 18 is provided with a threaded bore 20 extending therethrough and the wall of each of these bores 20 is provided with an enlarged counterbore 21, shown in Figure 8.

An externally threaded bushing 22 is threaded into each of the bores 20 to press against a packing ring 23 having a part located in the counterbore 21.

Extending through the head 18 and the bushing 22 and packing 23 thereof is the connecting rod 24, while extending through the parts 22 and 23 on the head 17 is the barrel or sleeve 25. The inner end of the rod 24 with respect to the cylinder 15 is threaded for disposition through the piston plate $a$ of the piston generally referred to by numeral 26, while the inner end of the barrel 25 is threaded for disposition through the plate $b$ of the piston 26. The plates $a$ and $b$ are recessed in their opposed sides as at 27 to receive the packing means 27$^a$ and the plates operate snugly against each other in the manner as substantially shown in Figure 8. Furthermore the barrel 25 and the rod 24 abut each other and as shown in Figure 8, the end of the rod 24 within the cylinder is provided with an elongated reduced extension 28 which extends through the barrel 25 and beyond the outer end of the barrel.

It will be observed in Figure 8, that the rod 24 at its inner end with respect to the cylinder 15 is hollow to provide a chamber 29 the interior of which communicates with the interior of the cylinder 15 by way of the ports 30. Operative in the chamber 29 is a follower 31 acting against the compressible coiled spring 32, this follower 31 being in the form of a valve normally closing the port 33 to the atmosphere. Obviously, in the event of an excessive pressure development in the cylinder 15, the pressure will exert itself against the follower 31, compressing the spring and exposing the port 33 to the interior of the chamber 29. Thus the pressure can release itself to the atmosphere without causing any damage to the mechanism.

The outer end of the barrel 25 (see Figure 8) is squared as at 34 for disposition through a square opening in the shank 35 of the quadrant gear 36. Between the gear shank 35 and the outer end of the extension 28 is a suitable bearing mount 37.

The head 17 is provided with a laterally disposed lug 38 superimposed on the lug 39 which projects laterally from the cylinder 15 and through these lugs is a bore for journally receiving the stub shaft 40 projecting inwardly from the semi-cylindrical shaped gear 41, the latter meshing with the aforementioned quadrant gear 36. The end of the stub shaft 40 projected through the lugs 39 is equipped with a crank 42, the angularly disposed end portion 43 of which extends a substantial distance away from the cylinder 15.

Now referring particularly to the clutch locking mechanism, it can be seen, that numeral 44 represents a spider the leg portions of which are secured as at 45 to the front wall of the fly wheel 12. There is sufficient clearance between the legs of the spider to accommodate the connecting rods 24 which connect to the collar 46 on the crank 47 of the drive shaft, this drive shaft having its rear end bearing in the forward end of the driven shaft 6 as at 48.

The spider 44 merges into a sleeve like construction 49 through which the drive shaft extends and between this sleeve like construction 49 and the drive shaft 5 is a bearing 50.

A collar 51 is slidable on this sleeve like construction 49 and has a longitudinally extending slot 52 on the inner side thereof as shown in Figure 4. This slot 52 is provided with an oblique extension 53 at its forward end in which the pin 54 projecting outwardly from the sleeve 49 normally projects. There may be a pair of these slots 52—53 and a pair of the pins 54 on the aforementioned sleeve 49.

Extending into the case 9 is a shaft 55 equipped with a yoke 56 having inwardly disposed pintles bearing into the circumferentially extending groove 57' of the collar 51. This shaft 55 extends exteriorly of the case 9 and is connected to either a hand or foot lever whereby the yoke 56 and collar 51 can be manipulated.

Radiating from the collar 51 are the arms 57, one for each of the cylinders 15. Each of these arms 57 is provided with a longitudinally extending slot 58 at its outer end for receiving the end portion 43 of the corresponding crank 42.

It can now be seen that the drive shaft 5 in operating will move the pistons 26 back and forth in their respective cylinders 15. The oil in each cylinder 15 will pass backwardly and forwardly through the ports 60 in the piston plates a and b.

As the speed increases, and it is desired to lock the clutch mechanism in the high speed position, the foot or hand lever is operated to actuate the shaft 55 which in turn through the yoke 56 slides the collar 51 rearwardly on the sleeve 49 and at the same time rotates the same slightly on said sleeve to the end that the arms 57 will engage the cranks 42 and swing the same so as to partly rotate the semi-cylindrical shaped gears 41. This rotation of each gear 41 is transmitted through the arm 35 of gear 36 to rotate the barrel 25 with the result that the piston plate b is revolved against the plate a. In this manner, the ports 60 of the plate b are closed against the main body of the plate a and thus the pistons are secured against motion in the cylinders 15. To obtain the proper locking relation of parts incident to said rearward movement of the collar 51, the spring 61, Figure 1, will force the internal gear 62 over the toothed end 63 of the sleeve 49 and as this gear 62 is splined to the drive shaft 5, the drive will be directly from the drive shaft 5 by way of the gear 62 and sleeve and spider, to the fly wheel 12.

The shaft 55 is reversed in the opposite direction to disengage the last mentioned parts so that the clutch can be restored to automatic operation.

As will be observed in Figure 9, the piston plate a is provided with a small pin opening 65 which will register with one of the ducts 60 of the piston plate b when the ports are in closed relation with respect to each other. This opening 65 is provided so that the pressure on each side of the piston 26 can become equalized when the automatic clutch is out of use and the drive is direct from the drive to the driven shafts through the positive clutch elements 62, 63.

While the foregoing specification sets forth the invention in specific terms, it is to be understood that numerous changes in the shape, size and materials may be resorted to without departing from the spirit or scope of the invention as claimed hereinafter.

Having thus described my invention, what I claim as new is:

1. In a hydraulic clutch, a cylinder, a piston therein composed of a pair of apertured plates, a piston rod extending through one end of the cylinder and connected with one plate and having a reduced part extending through the other end of the cylinder, a sleeve rotatably arranged on said reduced part and having its inner end connected to the other plate and means for rotating the sleeve to move said other plate relative to the first plate to move the apertures of the two plates into and out of register, one plate having a small hole therein for registering with an aperture of the other plate when the apertures of the two plates are out of register.

2. In a hydraulic clutch, a cylinder, a piston therein composed of a pair of apertured plates, a piston rod extending through one end of the cylinder and connected with one plate and having a reduced part extending through the other end of the cylinder, a sleeve rotatably arranged on said reduced part and having its inner end connected to the other plate and means for rotating the sleeve to move said other plate relative to the first plate to move the apertures of the two plates into and out of register, the large part of the rod having a chamber therein and also having a port for connecting the chamber to the interior of the cylinder and a second port connecting the chamber to the atmosphere, and a spring pressed valve for normally closing the second port but opening the port when the pressure in the cylinder and chamber becomes excessive.

3. In combination with a drive shaft, a driven shaft, clutch means for connecting the two shafts together and including a spring actuated member, hydraulic clutch means connecting the two shafts together and including cylinders having valved pistons therein and cranks for opening and closing the valved pistons; a manually operated member supported for sliding and rotary movement, the rotary movement controlling the cranks and the sliding movement controlling the spring pressed member of the first clutch, and means for simultaneously causing sliding and rotary movement of the manually operated member when the same is actuated, said manually operated member permitting movement of the first clutch by the spring actuated member to operating position when the valved pistons are substantially closed.

WILLIAM F. GOEHRING.